(12) United States Patent
Moritz et al.

(10) Patent No.: US 9,587,291 B2
(45) Date of Patent: Mar. 7, 2017

(54) METHOD FOR TREATING ALUMINUM SLAGS

(75) Inventors: Matthias Moritz, Rheinberg (DE); Christian Niedwiedz, Rheinberg (DE)

(73) Assignee: Aumond Fördertechnik GmbH, Rheinberg (DE)

(*) Notice: Subject to any disclaimer, the term of this patent is extended or adjusted under 35 U.S.C. 154(b) by 698 days.

(21) Appl. No.: 14/001,426

(22) PCT Filed: Feb. 25, 2011

(86) PCT No.: PCT/EP2011/000926
§ 371 (c)(1),
(2), (4) Date: Jan. 3, 2014

(87) PCT Pub. No.: WO2012/113418
PCT Pub. Date: Aug. 30, 2012

(65) Prior Publication Data
US 2016/0145716 A1 May 26, 2016

(51) Int. Cl.
*C22B 21/00* (2006.01)
*C22B 7/04* (2006.01)
*C22B 1/00* (2006.01)

(52) U.S. Cl.
CPC .......... *C22B 21/0007* (2013.01); *C22B 1/005* (2013.01); *C22B 7/04* (2013.01); *C22B 21/0069* (2013.01); *Y02P 10/212* (2015.11)

(58) Field of Classification Search
CPC ....... C22B 7/04; C22B 1/005; C22B 21/0069; C22B 21/0007
See application file for complete search history.

(56) References Cited

U.S. PATENT DOCUMENTS 3,534,910 A * 10/1970 Brumagin ................ C22B 7/04
241/23
4,394,978 A * 7/1983 Weiss ........................ B03B 9/04
241/23

FOREIGN PATENT DOCUMENTS

CN 200955752 Y 10/2007
CN 101285007 A 10/2008
(Continued)

OTHER PUBLICATIONS

Pannier et al. EP 023221 A1 published Dec. 1987. Machine translation.*
(Continued)

*Primary Examiner* — George Wyszomierski
*Assistant Examiner* — Tima M McGuthry Banks
(74) *Attorney, Agent, or Firm* — Johnson, Marcou & Isaacs, LLC; Jennifer S. Stachniak

(57) ABSTRACT

In a method for treating aluminum slags (41) in the form of dross or aluminum salt slags obtained in the preparation of aluminum, the aluminum slag (41) in the melting process is brought onto a cooling conveyor (16). A first section (18) of the cooling conveyor is flushed with an inert gas and a second section (29) serves for further cooling of the aluminum slag (41) with introduction of air. In the first section (18), the aluminum slag (41) is cooled to a temperature at which the aluminum slag (41) can no longer be chemically changed by exposure to atmospheric oxygen. In the second section (29), the slag is cooled to a temperature at which the cooled aluminum slag (41) can be processed further to recover the aluminum after leaving the cooling conveyor (16).

12 Claims, 2 Drawing Sheets

(56) References Cited

FOREIGN PATENT DOCUMENTS

| | | | | |
|---|---|---|---|---|
| CN | 201214247 Y | | 4/2009 | |
| EP | 0232221 A1 | * | 8/1987 | ......... C22B 21/0069 |
| JP | 2001-020020 A | * | 1/2001 | |
| WO | WO 2005106054 A | * | 11/2005 | |

OTHER PUBLICATIONS

Boin et al. WO 2005106054 AI published Nov. 2005. Machine translation.*

* cited by examiner

METHOD FOR TREATING ALUMINUM SLAGS

The instant application should be granted the priority date of Feb. 25, 2011, the filing date of the corresponding International patent application PCT/EP2011/000926.

BACKGROUND OF THE INVENTION

The invention relates to a method for treating aluminum slag obtained in the processing of aluminum.

This type of aluminum slag accumulates with the primary product of aluminum as so-called waste material, whereby the slag floating on the surface of the melt is scraped from the aluminum surface of the bath. This waste material contains diverse combustion products and released residue from the furnace infeed of the melting furnace in addition to metallic aluminum and aluminum oxide. According to the portion of aluminum contained in the waste material, the waste material is designated as skimmings (aluminum portion is >45%) or as dross (aluminum portion<45%). In so far as the waste material is supplied to a further processing step for recovery of the aluminum portion contained therein, the waste materials are underlying after their sloughing off from the bath surface based on the oxidation processes that use the effective surrounding atmosphere, which lead in addition to damaging gases in the working atmosphere of the melting furnace. Thus, it is known to scrape the waste material into a container and to cool this container under a protective gas atmosphere to a non-dangerous temperature level, which requires a correspondingly large amount of time.

Aluminum slags are also obtained with secondary production of aluminum from aluminum scrap, and herein in a still greater scope. In so far that in the frame of the salt bath processes used for secondary production, salt mixtures of NaCl and KCl are provided, so-called aluminum salt slags are formed, which likewise contain recoverable portions of aluminum. In particular, also these aluminum salt slags increase upon casting of the liquid rough melt to a direct reaction with the surrounding atmosphere, whereby on the one hand, the recovery of the aluminum portions from the aluminum salt slags is made more difficult, and on the other hand, dangerous gasses are released in the working area of the melting furnace.

SUMMARY OF THE INVENTION

The solution of this object is provided by advantageous embodiments and further developments of the invention from the content of the patent claims, which are appended hereto.

The invention contemplates in its essential concept a method, in which the aluminum slag obtained in the melting process with the exception of the surrounding atmosphere is brought onto a cooling conveyor arranged in a housing provided with a suction assembly, whose first section connected to the infeed of the aluminum slag is sprayed with an inert gas and whose second section serves for further cooling of the aluminum slag with the introduction of air, whereby the lengths of the first and second section of the cooling conveyor are designed, such that in the first section, a cooling of the aluminum slag to a temperature takes place, in which the aluminum slag, upon introduction of atmospheric oxygen, is no longer chemically changeable, and in the second section, cooling to a temperature takes place, in which the cooled aluminum slag can be processed further after leaving the cooling conveyor for recovery of the aluminum portion of the aluminum slag.

The present invention offers the advantage that the aluminum slag is directly closed off from the surrounding atmosphere after it is obtained, so that the entry of atmospheric oxygen into the aluminum slag is prevented. The cooling of the aluminum slag on the cooling conveyor takes place on a first section of the cooling conveyor using an inert gas, since in this manner, the entry of atmospheric oxygen and therewith, an oxidation of the aluminum slag is prevented. First, with correspondingly designed lengths of the first cooling section, when the aluminum slack has reached a temperature at which the aluminum slag no longer can be chemically changed by introduction of atmospheric oxygen, so that a further reaction of the aluminum slag or of the aluminum portion contained therein with the atmospheric oxygen no longer occurs, the further cooling of the aluminum slag to a temperature suitable for further processing occurs in the second section of the cooling conveyor via a known cooling process by means of convection cooling, in which via suctioning from the housing of the cooing conveyor, corresponding cooling air is drawn in and released gases, in particular HF gases, are drawn out. It is understood that the cooling conveyor is arranged in a housing, which has a regulated supply which makes possible a suctioning of the inert gas as well as the cooling air.

Since the method according to the present invention is useable for waste material obtained during the primary production of aluminum as well as for aluminum salt slag recovered during secondary production, different portions of aluminum are present, respectively, in the slags to be treated, which affect the reactivity of the slags to be treated with atmospheric oxygen in view of the adjustment of different end temperatures for the design of the first section of the cooling conveyor. In this regard, the design of the length of the first section of the cooling conveyor impinged with the inert gas depends on the respective process used for the production of aluminum, that is, if aluminum slags or aluminum salt slags with higher or lower amounts of aluminum are to be treated.

On the whole, according to one embodiment of the invention, it can be provided that a cooling of the aluminum slag takes place in a first section of the cooling conveyor from a temperature of 600° Celsius to 300° Celsius, whereby the determination of the end temperature of the first cooling section is dependent on the portion of the aluminum contained in the slag to be treated. Typically, this temperature lies within the previously noted temperature range.

The temperature suitable for further processing of the aluminum slag is <150° Celsius according to one embodiment of the invention.

Regarding the transfer of the aluminum slag onto the cooling conveyor, the present invention contemplates according to a preferred embodiment that the aluminum slag obtained in the melting process is collected in a container that can be closed against the surrounding atmosphere and the closed contained after its filling with the aluminum slag is emptied within a housing on the cooling conveyor that is closed against the surrounding atmosphere. In this regard, the quasi-continuous treatment of the obtained aluminum slag is advantageous, in that this aluminum slag is transferred into a container and the container then is emptied non-continuously onto the cooling conveyor. According to the amount of the obtained slag, a container circuit can be provided in a known scope.

With an alternative embodiment of the present invention, it is provided that in turn, the aluminum slag obtained in the melting process is collected in a container that can be closed via a cover against the surrounding atmosphere. For transferring of the container contents onto the cooling conveyor, a transfer station is formed on the housing of the cooling conveyor, which is closed against the surrounding atmosphere and only can be opened when a container is placed on the transfer station.

According to an exemplary embodiment, when the container is placed on the transfer station, an opening device arranged in the floor of the container and an opening device arranged in the placement area for the container on the transfer station are opened and after emptying of the container onto the cooling conveyor, are again closed, whereby it can be provided that the respective opening devices on the transfer station and the container are formed as valve slides.

With the previously noted exemplary embodiments, the advantage is provided that a complete closure of the cooling conveyor against the surrounding atmosphere is provided, whereby in comparison with the alternatively provided housing, a reduction of the inert gas used on the first section of the cooling conveyor is provided. The regulated output of the container contents onto the cooling conveyor leads to a constant layer height as well as a covering of the cooling conveyor over its entire width, so that the cooling process is thereby improved. Based on the double locks provided on the transfer station and the container, only minimal loss of the inert gas that is used can be expected, and as a result, also no release of HF exhaust occurs.

Also other possibilities are contemplated; for example, the cooling conveyor also can be directly connected to the melting furnace, so that a transfer of the scraped-off slag onto the cooling conveyor occurs. Alternatively, also a shorter transfer conveyor can be provided.

According to an exemplary embodiment of the invention, it is provided that argon is used as the inert gas for cooling the aluminum slag on the first section of the cooling conveyor.

It can be provided further that the insert gas suctioning from the first section of the cooling conveyor is provided to a reprocessing device and the recycled inert gas is resupplied to the cooling conveyor, whereby likewise it can be provided that the processing of the inert gas includes a heat recovery stage and gas scrubbing.

With regard to the cooling air drawn in in the second section of the cooling conveyor, according to an exemplary embodiment, it is provided that the cooling air suction from the second section of the cooling conveyor is conducted through an air purification assembly, whereby likewise, based on the energy efficiency of such an assembly, it can be provided that the cooling air is conducted through a heat recovery stage.

BRIEF DESCRIPTION OF THE DRAWINGS

In the drawings, exemplary embodiments of the invention are provided, which will be described below. In the drawings.

DETAILED DESCRIPTION OF THE PREFERRED EMBODIMENTS

Figure 1:
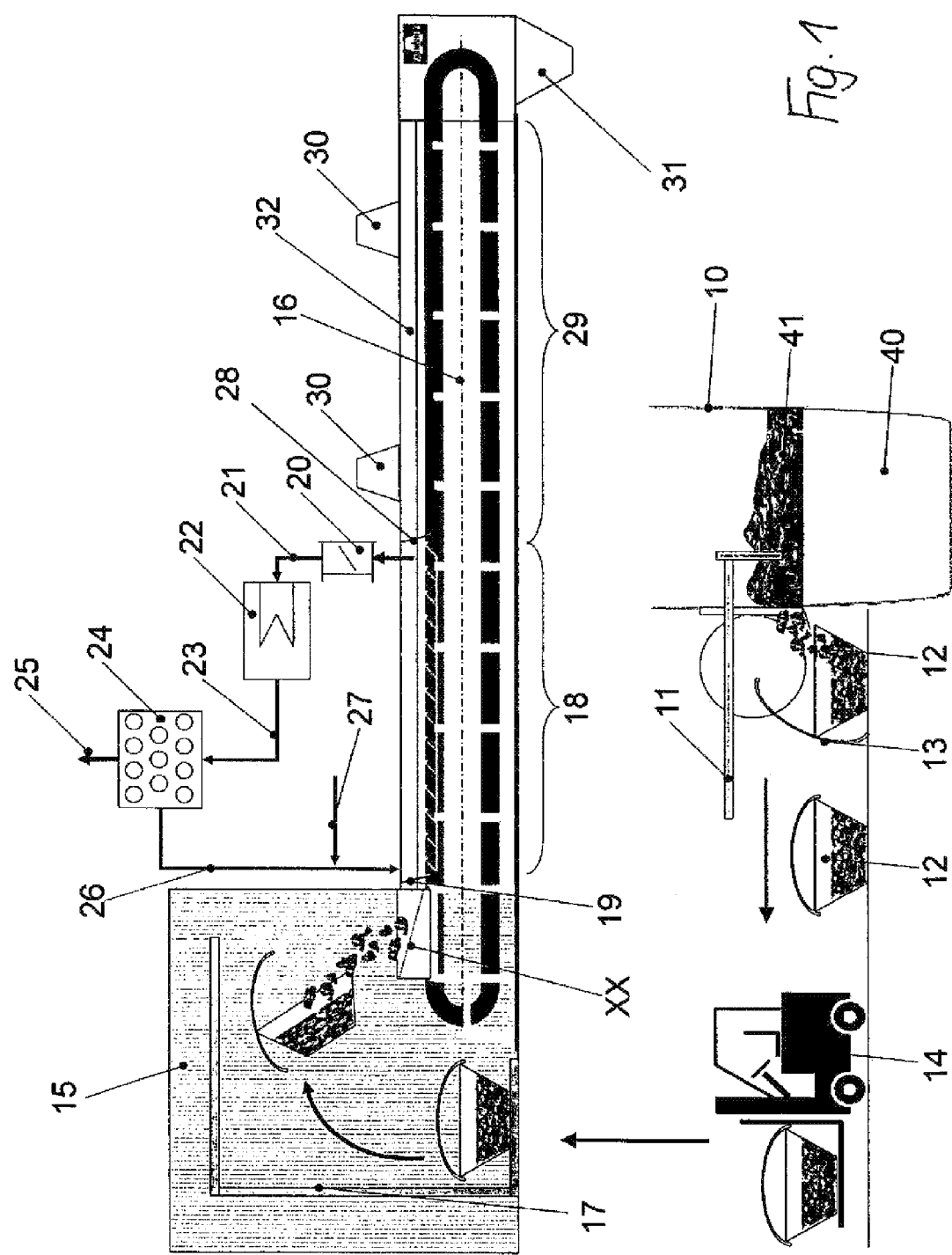
FIG. 1 shows a schematic process flow with reference to the presentation of correspondingly arranged assemblies for performing the method.

In a melting furnace 10, by melting down aluminum scrap with the addition of a corresponding salt mixture, a melt 40 of pure aluminum with aluminum slag floating thereon in the form of a so-called aluminum salt slag is provided; the aluminum slag 41 is kept from the melting furnace 10 by means of a scraper or during the casting of the aluminum melt 40 and directly brought into a container 12, which is sealable by means of a cover 13 in a suitable manner against entry of atmospheric oxygen.

With the exemplary embodiment described in FIG. 1, the container 12 closed by means of the cover 13 is received by a forklift 14 and placed in a housing 15, which likewise is sealed against entry of the surrounding atmosphere. It is understood that for introducing the fork lift 14 into the housing 15, corresponding locks are provided. In the interior of the housing 15, the infeed station 17 of a cooling conveyor 16 connected to the housing 15 is disposed, such that the container 12 can be emptied upon opening of its cover 13 within the housing 15 into the infeed station 17. The outlet of the cooling conveyor 16 from the housing 15 is affected by a corresponding sealing flap 19 lying on the material to be conveyed.

The cooling conveyor 16 is arranged within a housing 32 in a known manner, which enables a corresponding cooling medium to be supplied into the interior of the housing 31 and furthermore to cool the conveyed goods lying on the cooling conveyor 16, whereby the cooling medium is suctioned out of the housing 32. The formation of such a cooling conveyor is known essentially in the state of the art, for example, from WO 2004/074521 A2.

In the present case, the cooling conveyor 16 is subdivided into two sections and in fact, into a first section 18 and in a section 29 connected thereto. In the first section 18, argon as the inert gas is supplied into the housing 32 of the cooling conveyor 16 via a line 26, so that via the introduction of the argon, cooling of the aluminum slag 41 lying on the conveyor takes place. At the end of the first section 18, an exhaust station 20 for the supplied argon is arranged, from which the suctioned argon is supplied via a line 21 next to a heat recovery assembly 22. After a corresponding heat removal, the argon is supplied via a line 23 to a gas scrub 24, from which the recycled argon is in turn supplied to the cooling conveyor 16 via the line 26; exhaust 25 escapes from the gas scrub 24.

A separate second section 29 of the cooling conveyor is connected to the first section 18 of the cooling conveyor 16, which is separated from this first section by means of a sealing flap, in which now cool air is conducted into the housing 32, whereby the heated cooling air is suctioned via associated exhaust devices 30 from the housing 32. In accordance with the state of the art, this cooling air undergoes corresponding air purification and if necessary, is guided also through a heat recovery assembly. The material still lying on the cooling conveyor 16 on the end of the forward extension of the cooling conveyor 16 is brought via a discharge funnel 31 to the outside of the housing 32, from where it is supplied to the reprocessing treatment.

The ratio of the first section 18 to the second section 29 of the cooling conveyor 16 is designed, such that the aluminum slag 41 on the cooling conveyor 16, upon entry into the second section 29, no longer has a temperature above, for example, 400° Celsius, so that a reaction of the aluminum slag 41 with the atmospheric oxygen no longer occurs. The length of the second section 29 of the cooling conveyor 16 therefore is dimensioned, such that the temperature of the materials moved into the discharge funnel 31 is not more than 150° Celsius, preferably about 100° Celsius.

Figure 2:
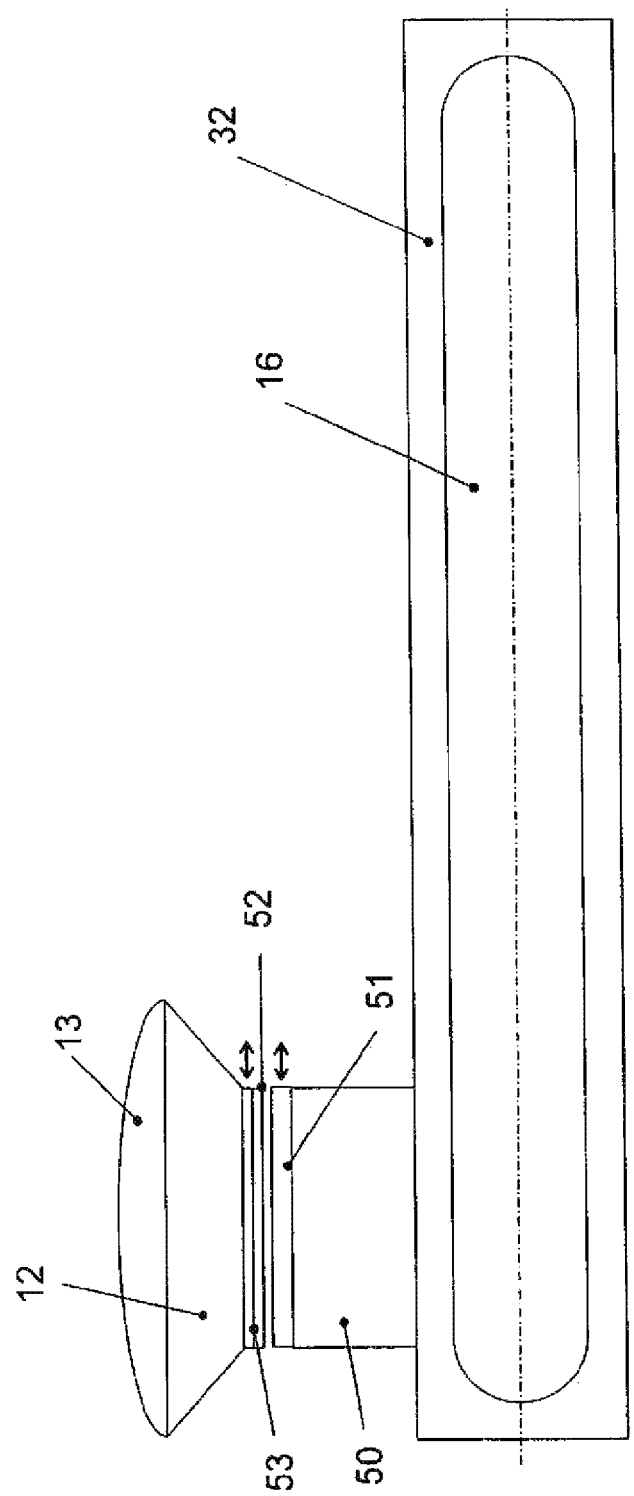
FIG. 2 shows a cooling conveyor with a housing and transfer station for emptying a container filled with aluminum slag.

The exemplary embodiment shown in FIG. 2 differs from the previously described embodiment only in the emptying of the container 12 on the cooling conveyor 16 filled with aluminum slag 41, alternatively to the device of the housing 15 described previously in connection with FIG. 1. As a device for transfer, the housing 32 of the cooling conveyor 16 is provided in its transfer region with a transfer station 50, onto which a container 12 transported by a forklift 14 can be placed. The container 12 is closed by means of the cover 13 against the surrounding atmosphere and has in its floor 52 an opening device in the form of a displaceable valve plate. The connector-like transfer station is dimensioned in its attachment area to the dimensions of the container supported thereon 13 and likewise has at its upper end a valve plate 51 as an opening device.

If the container 12 is placed on the transfer station 50 of the housing 32 of the cooling conveyor 16, then first the valve plate 51 oriented on the transfer station 50 is opened, in order to release the inlet of the cooling conveyor 16. Next, the valve plate 53 arranged in the floor 52 of the container 12 is opened in a controlled manner, such that the aluminum slag exiting from the container is distributed with a layer height that is as uniform as possible over the entire width of the cooling conveyor 16. After emptying of the container 12, the valve plate 52 formed thereon is first closed, then the valve plate 51 of the transfer station 50, so that the sealing of the housing 32 of the cooling conveyor 16 in particular is again created. Next, the empty container 12 can be taken up and returned into the container circuit.

The features of the subject matter of these assemblies that are disclosed in the preceding description, the patent claims, the abstract and the drawings can be useful individually as well as in any combination for realization of the invention in its various embodiments.

The specification incorporates by reference the disclosure of International application PCT/EP2011/000926, filed Feb. 25, 2011.

The present invention is, of course, in no way restricted to the specific disclosure of the specification and drawings, but also encompasses any modifications within the scope of the appended claims.

The invention claimed is:

1. A method for treating aluminum slag in the form of dross or aluminum salt slags obtained in the extraction of aluminum, comprising the following steps:
    placing the aluminum slag obtained in a melting process with exclusion of surrounding atmospheric air onto a cooling conveyor that is arranged in a housing, wherein said housing is provided with exhaust devices, wherein said cooling conveyor has a first section adjoining the supply of aluminum slag and a second section;
    flushing said first section with an inert gas to cool said aluminum slag on said cooling conveyor;
    further cooling said aluminum slag on the second section by introduction of air, wherein the lengths of the first section and the second section of the cooling conveyor are configured so that in the first section, the aluminum slag is cooled to a temperature at which the aluminum slag can no longer be chemically changed by exposure to atmospheric oxygen and in the second section, the aluminum slag is cooled to a temperature at which the cooled aluminum slag can be processed further to recover the aluminum in the aluminum slag after leaving the cooling conveyor.

2. The method according to claim 1, wherein cooling of the aluminum slag takes place in the first section of the cooling conveyor, and wherein the aluminum slag is cooled from a temperature of 600° Celsius down to a temperature of 300° Celsius.

3. The method according to claim 1, wherein on the second section of the cooling conveyor, a cooling of the aluminum slag to a temperature of less than 150° Celsius is performed.

4. The method according to claim 1, further comprising the steps of collecting the aluminum slag obtained in the melting process in a container that is closeable by a cover from the surrounding atmosphere and emptying the closed container after it is filled with the aluminum slag within a housing closed off from the surrounding atmosphere on the cooling conveyor.

5. The method according to claim 1, further comprising the steps of collecting the aluminum slag obtained in the melting process in a container that is closeable from the surrounding environment via a cover and placing the closed container after it is filled with the aluminum slag on a transfer station formed on the housing of the cooling conveyor, wherein said transfer station is configured to be closed off from the surrounding atmosphere and can be opened only when the container is placed thereon.

6. The method according to claim 5, wherein, when the container is positioned on the transfer station, an opening device arranged in a floor of the container and an opening device arranged in an attachment region for the container on the transfer station are opened and after emptying of the container on the cooling conveyor, are closed again.

7. The method according to claim 6, wherein the opening devices are formed on the transfer station and the container, respectively, as valve plates.

8. The method according to claim 1, wherein argon is used as the inert gas for cooling the aluminum slag on the first section of the cooling conveyor.

9. The method according to claim 1, further comprising the steps of feeding the inert gas through a reprocessing device and providing recovered inert gas again to the cooling conveyor.

10. The method according to claim 9, in which reprocessing of the inert gas includes a heat recovery stage and gas scrubbing.

11. The method according to claim 1, further comprising the steps of suctioning cooling air from the second section of the cooling conveyor and feeding the cooling air suctioned from the second section of the cooling conveyor through an air purification assembly.

12. The method according to claim 11, in which the cooling air is fed through a heat recovery stage.

* * * * *